US008310335B2

(12) United States Patent
Sivakkolundhu

(10) Patent No.: US 8,310,335 B2
(45) Date of Patent: Nov. 13, 2012

(54) NETWORK-BASED ACCESS AND CONTROL OF HOME AUTOMATION SYSTEMS

(75) Inventor: Premanand X. Sivakkolundhu, Tampa, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 991 days.

(21) Appl. No.: 11/851,567

(22) Filed: Sep. 7, 2007

(65) Prior Publication Data

US 2009/0066534 A1    Mar. 12, 2009

(51) Int. Cl.
*G05B 23/02* (2006.01)

(52) U.S. Cl. ......................................... 340/3.1

(58) Field of Classification Search ................. 340/5.72, 340/3.1, 5.1, 6.11; 710/8, 15
See application file for complete search history.

(56) References Cited

U.S. PATENT DOCUMENTS

| | | | | |
|---|---|---|---|---|
| 5,086,385 | A * | 2/1992 | Launey et al. | 700/83 |
| 6,326,946 | B1 * | 12/2001 | Moran et al. | 345/156 |
| 6,891,838 | B1 * | 5/2005 | Petite et al. | 370/401 |
| 7,730,223 | B1 * | 6/2010 | Bavor et al. | 710/8 |
| 2004/0213384 | A1 * | 10/2004 | Alles et al. | 379/70 |

* cited by examiner

*Primary Examiner* — Vernal Brown

(57) ABSTRACT

A device may include a memory to store a home automation graphical application and a processor to operate based on the home automation graphical application to establish via a network a communication link with a home automation system, and provide a graphical user interface to permit a user to view state information of home devices or modify home automation configuration data to control home devices.

18 Claims, 14 Drawing Sheets

… (1)

NETWORK-BASED ACCESS AND CONTROL OF HOME AUTOMATION SYSTEMS

BACKGROUND INFORMATION

Home automation systems are increasingly becoming an attractive option for controlling devices, such as appliances, heating and cooling systems, lights, entertainment systems, and security systems in the home. In one case, for example, a user may wish to program a turning on or a turning off of a device, such as a light. In another case, for example, a user may wish to program more sophisticated operations, such as setting a temperature in a room. Some home automation systems may include a central control unit that controls each of these devices.

DETAILED DESCRIPTION OF PREFERRED EMBODIMENTS

The following detailed description refers to the accompanying drawings. The same reference numbers in different drawings may identify the same or similar elements. Also, the following description does not limit the invention.

Figure 1:
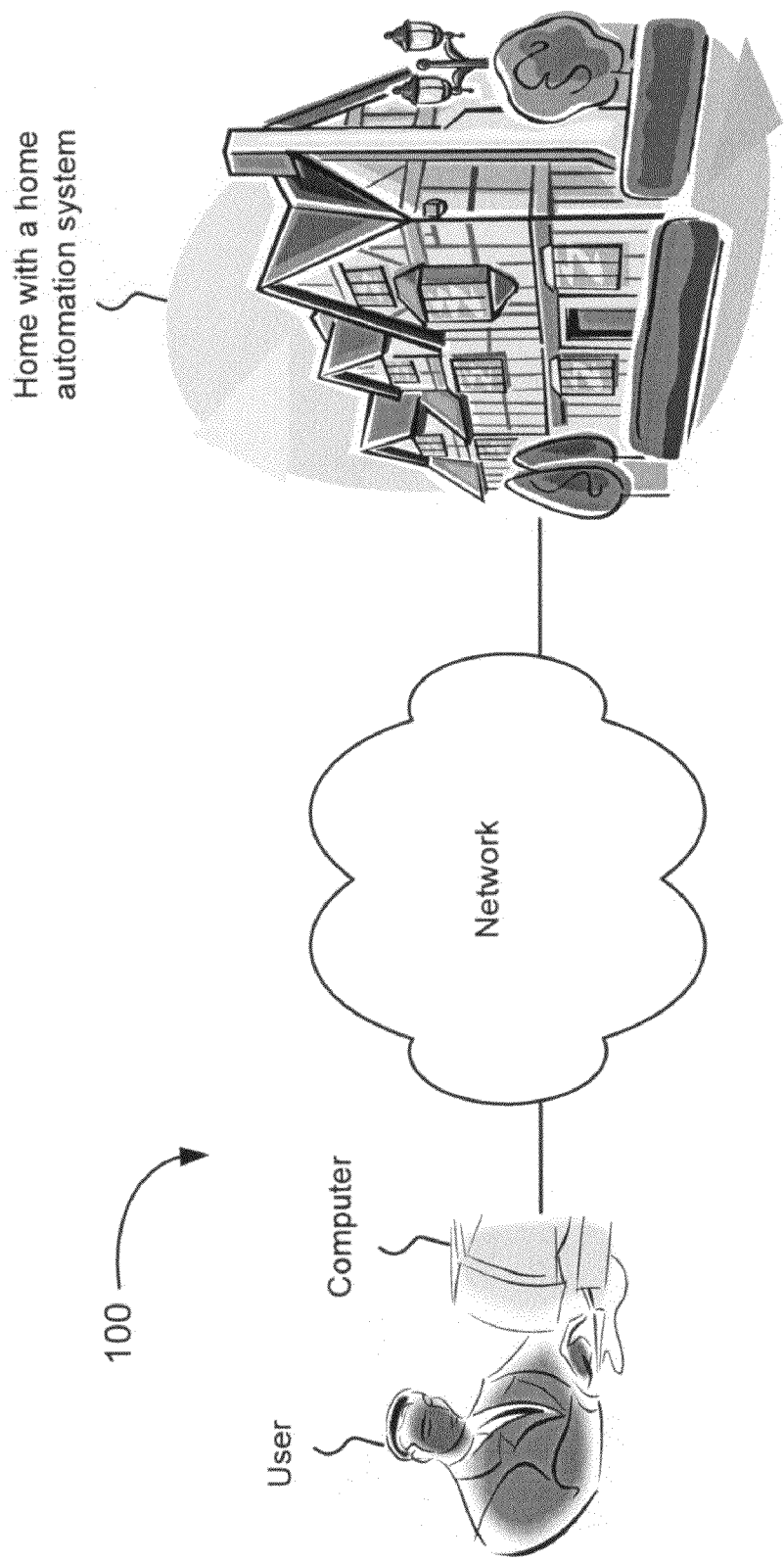
FIG. 1 is a diagram illustrating a concept described herein.

FIG. 1 is a diagram illustrating a concept 100 described herein. As illustrated, a user of a computer (or another type of device) may access and control his home automation system via a network. In this example, the user may be at work and using his work computer. The user may download an application from the network that will allow him to access and control his home automation system. The home automation system may include, for example, a network accessible control module. The application may include a graphical user interface (GUI) that will allow the user to, for example, set-up, control, and/or monitor any device connected to his home automation system. Thus, a user may manage a home automation system from any remote location with a communicative device that can access a network connected to the home automation system.

Figure 2:
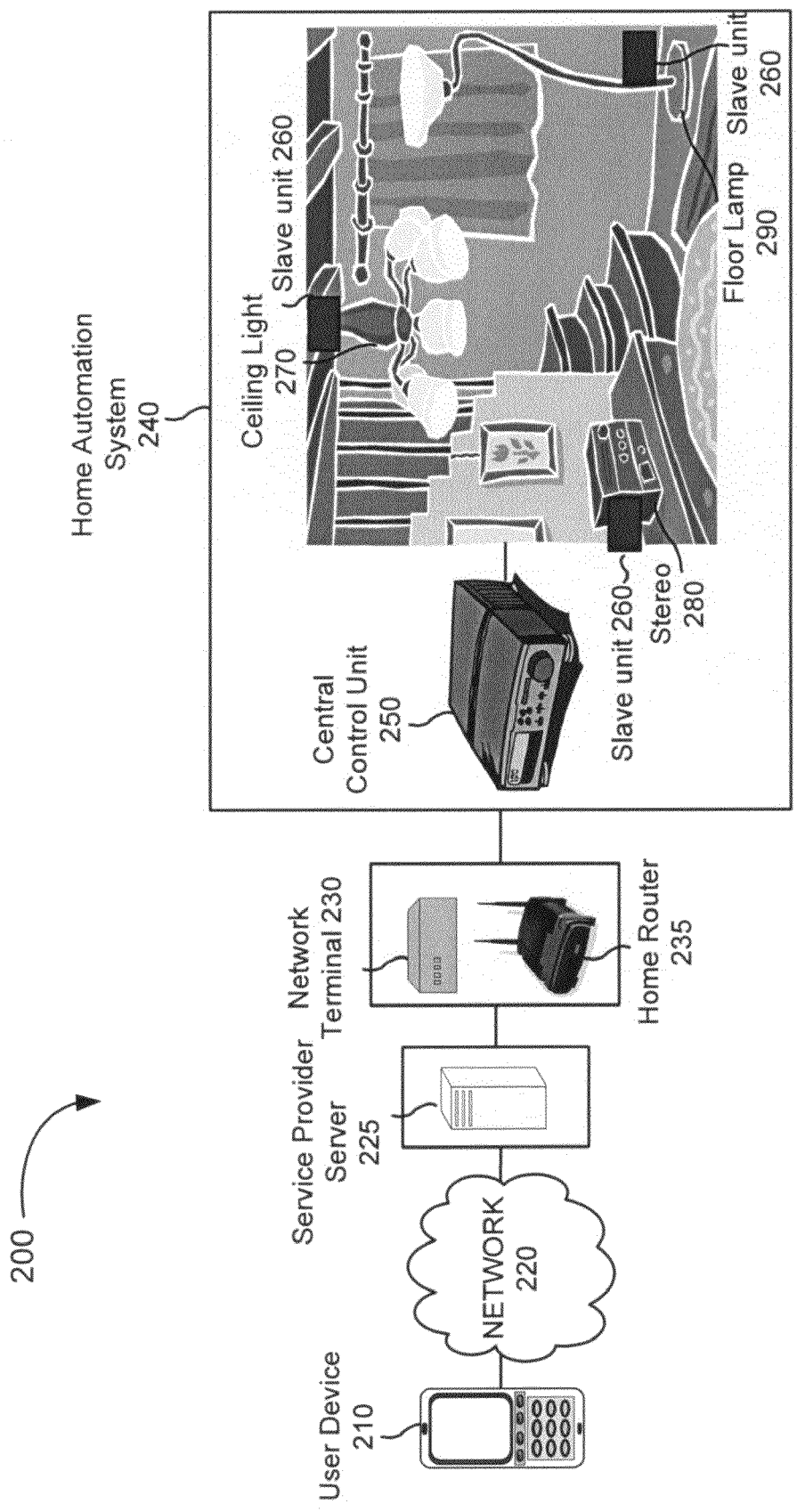
FIG. 2 is a diagram illustrating an exemplary system in which devices and methods described herein may be implemented.

FIG. 2 is a diagram illustrating an exemplary system in which devices and methods described herein may be implemented. FIG. 2 illustrates an exemplary system 200 that may include a user device 210, a network 220, a service provider server 225, a network terminal 230, a home router 235, and a home automation system 240. Home automation system 240 may include a central control unit 250 and slave units 260. Each slave unit 260 may be connected to a device, such as a ceiling light 270, a stereo 280, or a floor lamp 290. While FIG. 2 illustrates direct connections between the various components of system 200, in other implementations, a connection may be indirect via, a node, a network, or a combination thereof.

User device 210 may be a device that is capable of communicating with a network, such as network 220. For example, user device 210 may include a portable communication device, such as a personal digital assistant (PDA), a laptop computer, or a mobile phone. In other instances, user device 210 may include a stationary communication device, such as a desktop computer. User device 210 may communicate with network 220, for example, via a wireless and/or wired connection.

Network 220 may include one or more series of nodes interconnected by communication links. For example, network 220 may include a wireless network, a private network, a wide-area network (WAN), the Internet, an intranet, a switched network, etc. Network 220 may include a combination of networks. Network 220 may connect with service provider server 225, for example, via a wireless and/or wired connection.

Service provider server 225 may include a device, such as a computer system, that is capable of communicating with network 220 and network terminal 230. In one implementation, service provider server 225 may be a single device. In another implementation, service provider server 225 may include multiple devices that are either co-located or remotely located. In one implementation service provider server 225 may be a Web server. Service provider server 225 may connect to network terminal 230, for example, via a wireless and/or wired connection.

Network terminal 230 may include any device capable of connecting other devices to a network, such as network 220 and/or service provider server 225. For example, network terminal 230 may be an optical network terminal or a modem (e.g., cable or Digital Subscriber Line (DSL) modem), or another type of modem, and may operate as an intermediary component between service provider server 225 and home router 235. Home router 235 may include any device capable of connecting network terminal 230 and home automation system 240. For example, home router 235 may be a wireless router. In another implementation, home router 235 may be a wired router. In one implementation, home router 235 may be an Internet Protocol (IP) wired/wireless router. Home router 235 may also provide firewall functionality, such as packet filtering and protection against rogue attacks.

Home automation system 240 may include multiple components that allow a user to access and control the operation of a home device. In one implementation, home automation system 240 may include a central controller, such as central control unit 250, and a component connected to a home device, such as slave unit 260. In such an implementation, the user may access and control the operation of a home device via central control unit 250.

Central control unit 250 may include any logic capable of communicating with and/or controlling a home device. Logic, as used herein, may include hardware, software, and/or or a combination of hardware and software. For example, central control unit 250 may be a display and keypad module mounted on a wall. In other instances, central control unit 250 may a desktop module.

In one implementation, central control unit 250 may control a home device via slave unit 260. For example, central control unit 250 may establish a communication link to slave unit 260. In one implementation, the communication link may be a wireless link (e.g., radio frequency (RF)). Additionally, or alternatively, the communication link may be a wired link (e.g., a 110 Volt AC line of a wall socket). Central control unit 250 may communicate with slave unit 260 using a standard protocol (e.g., X10) or a proprietary protocol (e.g., an RF protocol or a wired protocol).

Slave unit 260 may include a component to transmit and/or receive information from central control unit 250. The type of control that slave unit 260 may provide may depend on the home device to which slave unit 260 is connected. For example, slave unit 260 of floor lamp 290 may control the turning on and the turning off of floor lamp 290. However, for example, slave unit 260 of ceiling light 270 may control the turning on and the turning off of ceiling light 270, as well as controlling the level of light (e.g., dimming); or, for example, slave unit 260 of stereo 280 may control various operations, such as selecting a compact disc (CD) in a CD changer, or selecting a radio station. Ceiling light 270, stereo 280, and floor lamp 290 are examples of home devices that a user may manage via central control unit 250.

Although, FIG. 2 illustrates exemplary components of system 200, in other implementations, system 200 may include additional, fewer, or different components than are depicted in FIG. 2. For example, home automation system 240 may not include central control unit 250. That is, home automation system 240 may include components having a peer-to-peer relationship and not a master/slave relationship. So, for example, when home automation system 240 includes components having a peer-to-peer relationship, user device 210 may connect to the peer-to-peer component to manage and control home devices connected thereto. In this regard, since most home automation systems operate analogous to a network, it is to be understood that numerous variations may exist with respect to home automation system 240, as described herein.

Additionally, it is to be understood that a single component may be implemented as multiple, distributed components. For example, home automation system 240 may include central control unit 250 for each floor or room of a home. Additionally, or alternatively, home automation system 240 may include additional devices, such as remote controls, that allow the user to control a home device.

Depending on the implementation of home automation system 240, modifications to home automation system 240 may be useful so that central control unit 250 is connectable to network 220 via home router 235 and network terminal 230. For example, central control unit 250 may include a network interface card or some other type of network interface adapter logic. Further, depending on the implementation of home automation system 240, protocol translation and/or protocol logic may be useful. For example, in one implementation, home automation system 240 may include logic for using transmission control protocol (TCP)/IP. Additionally, depending on the implementation of home automation system 240, home automation system 240 may use remote access logic, such as a remote access application, so that user device 210 may access and control, for example, central control unit 250.

Figure 3:
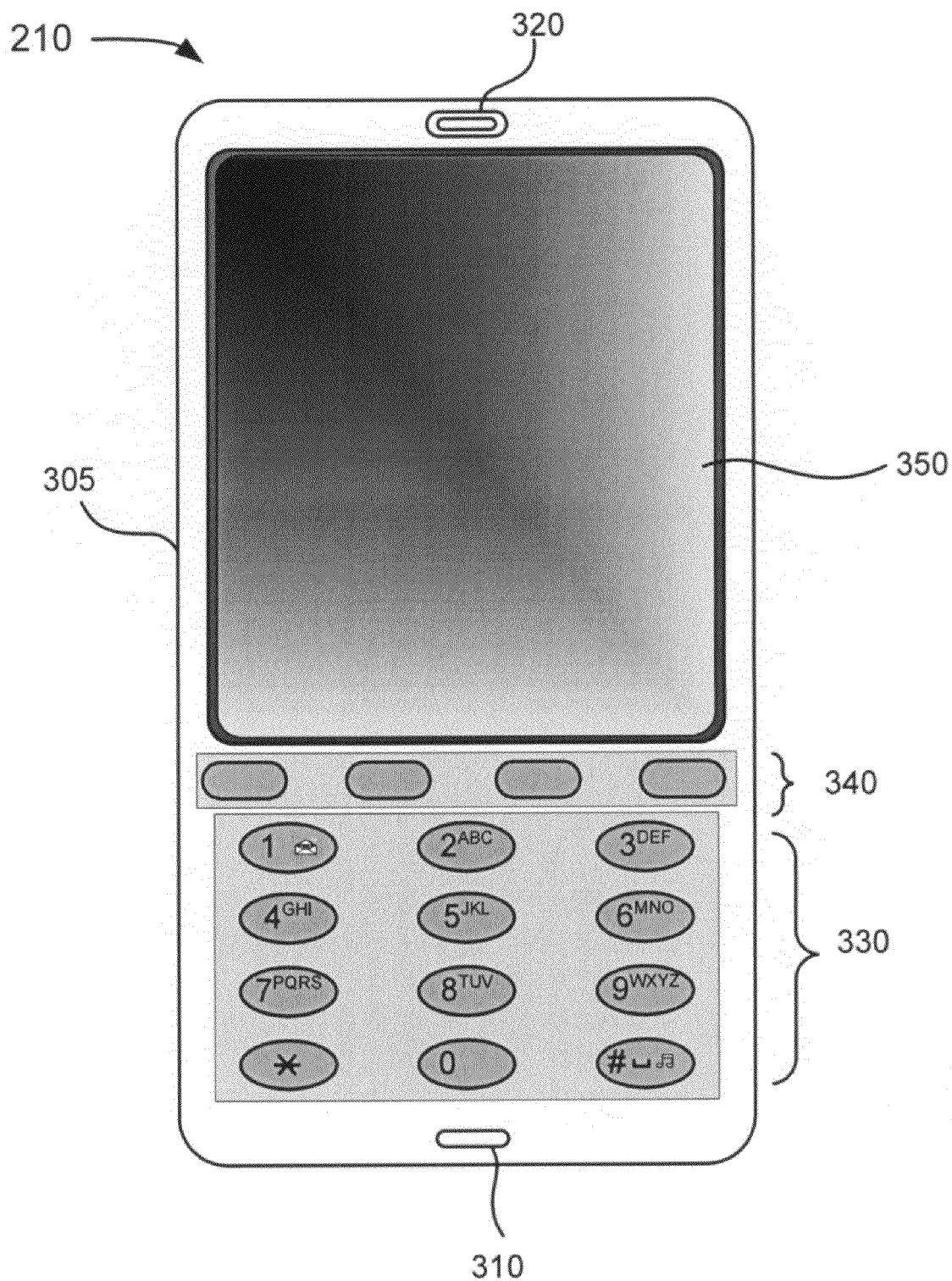
FIG. 3 is a diagram illustrating a front view of exemplary external components of the user device depicted in FIG. 2.

FIG. 3 is a diagram illustrating a front view of exemplary external components of the user device depicted in FIG. 2. As illustrated, user device 210 may include a housing 305, a microphone 310, a speaker 320, a keypad 330, function keys 340, and a display 350.

Housing 305 may include a structure configured to contain components of user device 210. For example, housing 305 may be formed from plastic and configured to support microphone 310, speaker 320, keypad 330, function keys 340, and display 350.

Microphone 310 may include any component capable of transducing air pressure waves to a corresponding electrical signal. For example, a user may speak into microphone 310 during a telephone call. Speaker 320 may include any component capable of transducing an electrical signal to a corresponding sound wave. For example, a user may listen to music through speaker 320.

Keypad 330 may include any component capable of providing input to user device 210. Keypad 330 may include a standard telephone keypad. Keypad 330 may include one or more special purpose keys. In one implementation, each key of keypad 330 may be, for example, a pushbutton. A user of user device 210 may utilize keypad 110 for entering information, such as text, phone numbers, or activating a special function.

Function keys 340 may include any component capable of providing input to user device 210. Function keys 340 may include a key that permits a user to cause user device 210 to perform one or more operations. The functionality associated with a key of function keys 340 may change depending on the mode of user device 210. For example, function keys 340 may perform a variety of operations, such as placing a phone call, playing various media, or accessing an application. Function keys 340 may include a key that provides a cursor function and a select function. In one implementation, each key of function keys 340 may be, for example, a pushbutton.

Display 350 may include any component capable of providing visual information. For example, in one implementation, display 350 may be a liquid crystal display (LCD). In another implementation, display 350 may be any one of other display technologies, such as a plasma display panel (PDP), a field emission display (FED), a thin film transistor (TFT) display, etc. Display 350 may be utilized to display, for example, text, images, and/or video information.

Although FIG. 3 illustrates exemplary components of user device 210, in other implementations, user device 210 may include fewer, additional and/or different components than depicted in FIG. 3. In still other implementations, one or more components of user device 210 may include the capabilities of one or more other components of user device 210. For example, display 350 may be used as an input device (e.g., a touch screen). Additionally, or alternatively, the external components may be arranged differently than the external components depicted in FIG. 3.

Figure 4:
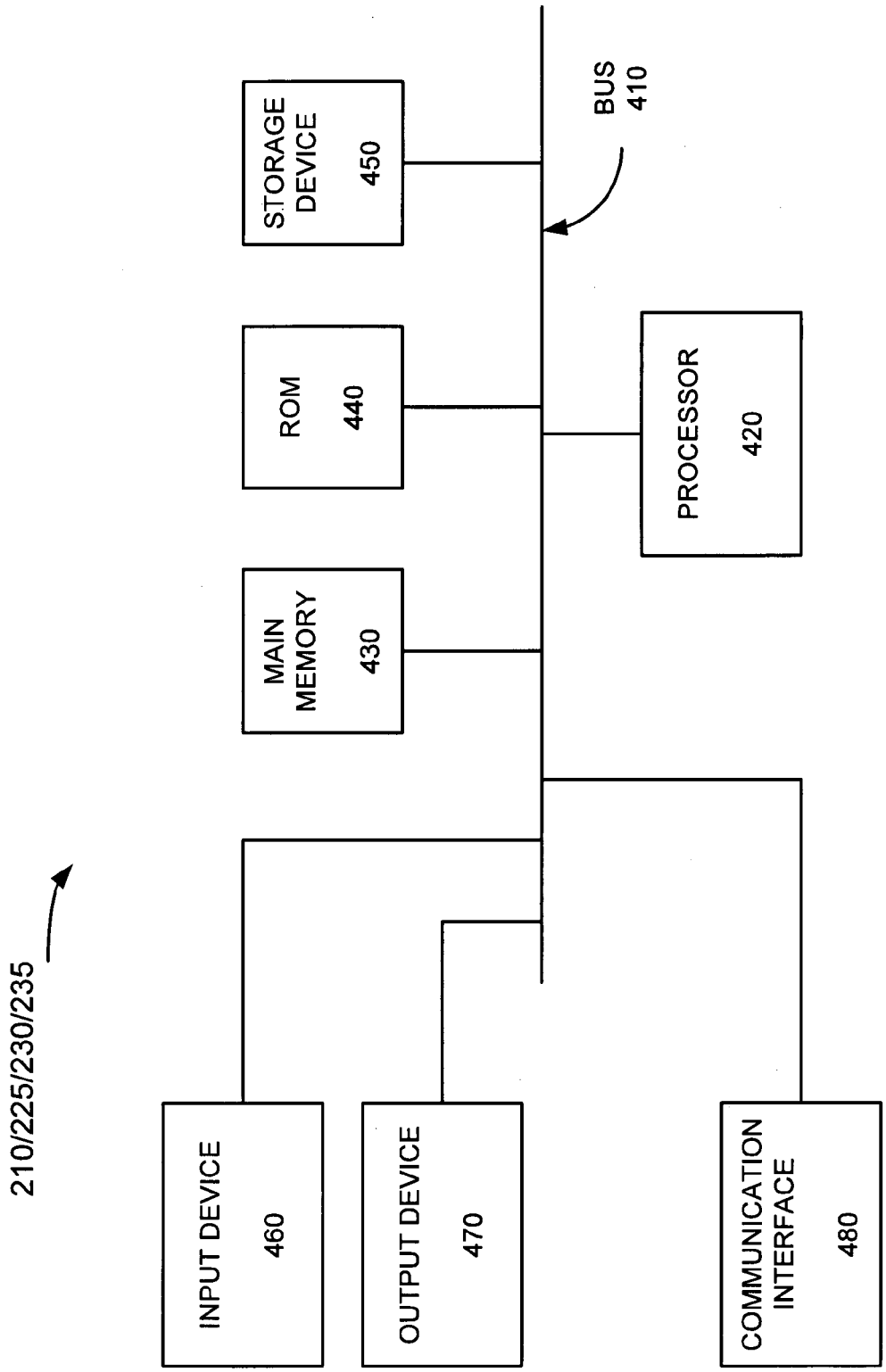
FIG. 4 is a diagram illustrating exemplary internal components of a device that may correspond to one or more of the user device, the service provider server, the network terminal and/or the home router depicted in FIG. 2.

FIG. 4 is a diagram illustrating exemplary internal components of a device that may correspond to one or more of the user device, the service provider server, the network terminal and/or the home router depicted in FIG. 2. As illustrated, the exemplary internal components may include a bus 410, a processor 420, a main memory 430, a read only memory (ROM) 440, a storage device 450, an input device 460, an output device 470, and a communication interface 480. Bus 410 may include a path that permits communication among the exemplary components of the device.

Processor 420 may include a processor, a microprocessor, or processing logic that may interpret and execute instructions. Main memory 430 may include a random access memory (RAM) or another type of dynamic storage device that may store information and instructions for execution by processor 420. ROM 440 may include a ROM device or another type of static storage device that may store static information and instructions for use by processor 420. Storage device 350 may include a magnetic and/or optical recording medium and its corresponding drive.

Input device 460 may include a mechanism that permits an operator to input information to the device, such as a keyboard, a button, a mouse, a pen, a microphone, voice recognition and/or biometric mechanisms, etc. Output device 470 may include a mechanism that outputs information to the operator, including a display, one or more light emitting diodes (LEDs), a printer, a speaker, etc. Communication interface 480 may include any transceiver-like mechanism that enables the device to communicate with other devices and/or systems. For example, communication interface 480 may include mechanisms for communicating with another device or system via a network, such as network 220.

As will be described in detail below, the device shown in FIG. 4, as described herein, may perform certain operations relating to the access and management of home automation system 240. The device may perform these operations in response to processor 420 executing software instructions contained in a computer-readable medium, such as main memory 430. A computer-readable medium may be defined as a physical or logical memory device and/or carrier wave.

The software instructions may be read into main memory 430 from another computer-readable medium, such as storage device 450, or from another device via communication interface 480. The software instructions contained in main memory 430 may cause processor 420 to perform processes that will be described later. Alternatively, hardwired circuitry may be used in place of or in combination with software instructions to implement processes described herein. Thus, implementations described herein are not limited to any specific combination of hardware circuitry and software.

Figure 5:
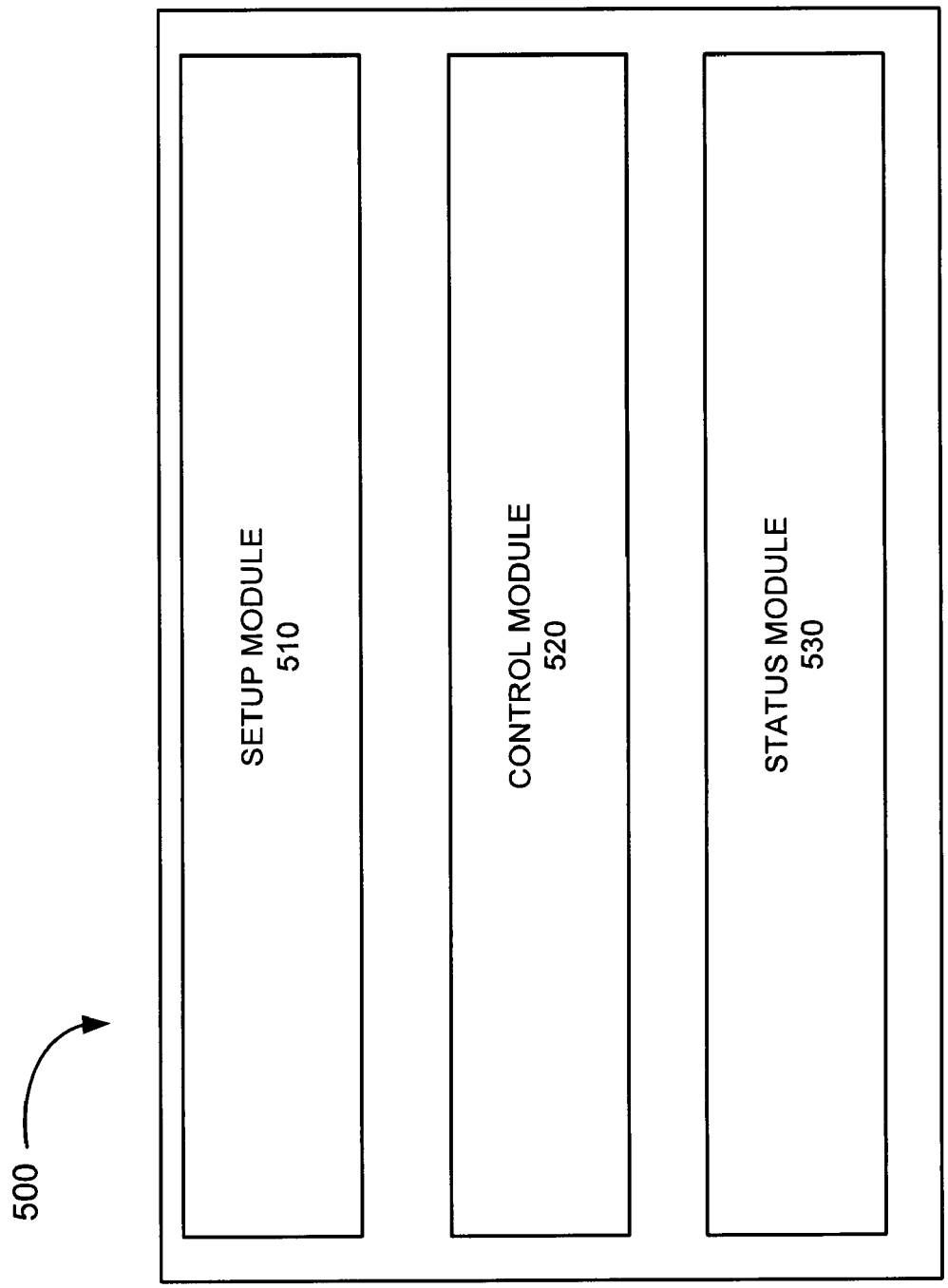
FIG. 5 is a diagram illustrating exemplary functional capabilities of a home automation module operable on the user device depicted in FIG. 2.

FIG. 5 is a diagram illustrating exemplary functional capabilities of a home automation module operable on the user device depicted in FIG. 2. FIG. 5 illustrates a home automation module 500. Home automation module 500 may be, for example, software that may be stored in memory 430. In one implementation, a user may be able to download home automation module 500 from a network, such as network 220.

Home automation module 500 may include a setup module 510, a control module 520, and a status module 530. It will be appreciated that user device 210 may include other modules (not illustrated) that aid in providing remote access and control of central control unit 250 of home automation system 240.

Given the wide variety of home automation systems available today, home automation module 500 may operate in accordance with an application programming interface (API) in order for home automation module 500 to provide an interface to central control unit 250 and/or slave units 260. The API may provide an interface to access and control various resources and services of central control unit 250 and/or slave units 260. The API may also provide an interface to access the networking capability of central control unit 250 and/or slave units 260, and to allow a user to remotely access central control unit 250 and/or slave units 260 via home automation module 500. Home automation module 500 may include a GUI component to allow a user of user device 210 to connect to central control unit 250.

Setup module 510 may provide a user of user device 210 the capability to initialize various parameters associated with home automation system 240. For example, setup module 510 may provide a GUI component that allows the user to create a graphical representation of home automation system 240 and/or the home devices connected thereto.

Setup module 510 may access and/or store configuration information from home automation system 240. For example, central control unit 250 may identify each room of a home as a zone, and within each zone may include zero or more slave units 260. In other implementations, central control unit 250 may identify each floor of a home as a zone, or a zone could represent indoor or outdoor regions, etc. In such an implementation, setup module 510 may provide a user with a graphical representation of this configuration. Additionally, setup module 510 may identify the type of home device connected to slave unit 260. For example, setup module 510 may indicate that a home device connected to slave unit 260 is a light. Setup module 510 may also provide the user with various customization features that provide a more user-friendly environment for managing the operation of home automation system 240, as will be described below in reference to FIGS. 7 through 11.

Control module 520 may provide a GUI component that allows a user of user device 210 to control various settings associated with the control of home devices connected to slave units 260. For example, a user may be able to control when a home device (e.g., ceiling light 270) turns on and/or turns off. Depending on the home device, more sophisticated parameters may be controlled. For example, a user of user device 210 may be able to turn on stereo 280, select a CD from a CD changer, and have stereo 280 play the selected CD at a certain time.

Control module 520 may provide a GUI component that allows a user of user device 210 to control various settings based on, for example, the home device, the category of the home device (e.g., lights, entertainment, indoor, outdoor, etc.), by room (e.g., a room in the home), by floor (e.g., an entire floor of the home), by home (e.g., a global setting, such as turning every device on or off), by time of day (e.g., day time or night time), by day (e.g., weekend, work day, Monday through Sunday), and/or by week.

Status module 530 may provide a GUI component that allows a user of user device 210 to view state information associated with, for example, a home device (e.g., floor lamp 290), a room (e.g., a room in the home), a floor (e.g., an entire floor in the home), a home (e.g., all rooms in the home and/or all devices in the home and/or outside of the home), or by a category of a home device (e.g., lights, entertainment, indoor, outdoor, etc.). In this way, a user may determine the operational status of any and all home devices connected to home automation system 240. For example, a user may determine whether ceiling light 270 is on or off. Depending on the home device, other operational statuses may be determined. For example, when the home device is a security camera, it may be possible to view video captured by the security camera on display 350 of user device 210.

Although FIG. 5 illustrates exemplary functional capabilities operable on user device 210, in other implementations, fewer, additional, and/or different functional capabilities than those depicted in FIG. 5 may be employed. In still other implementations, one or more functional capabilities may be operable on other devices of system 200. For example, service provider server 225 may include one or more of the functional capabilities described above. In such an instance, user device 210 may connect to service provider server 225 to access, control and/or manage one or more aspects of home automation system 240.

Figure 6A:
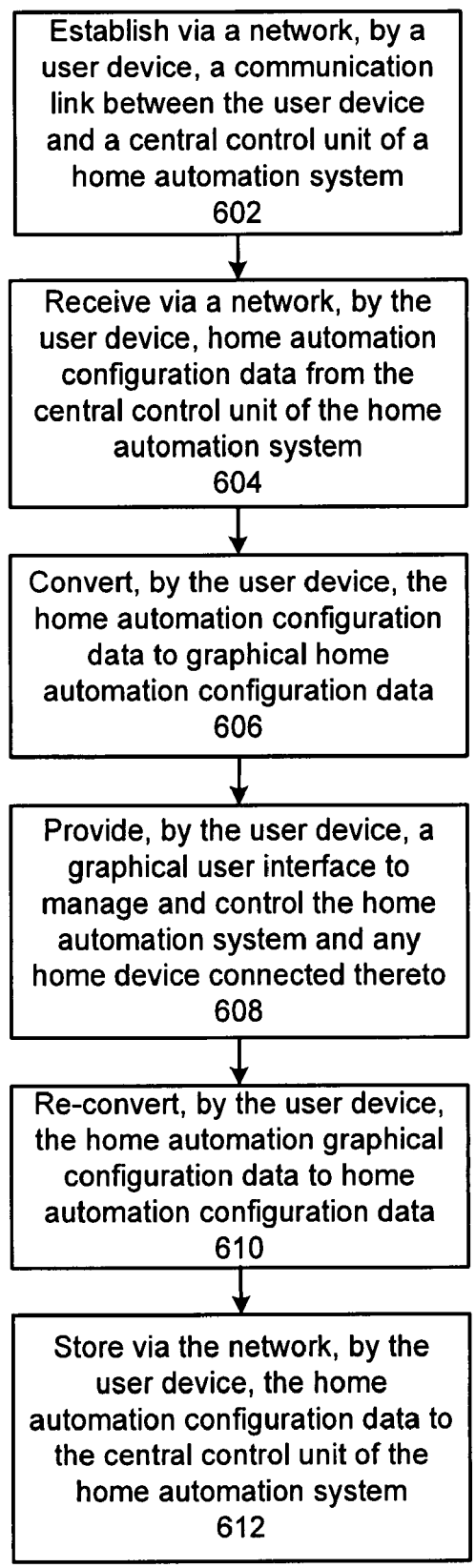
FIG. 6(a) is a flow chart of an exemplary process for managing a home automation system from a perspective of the user device.

FIG. 6(a) is a flow chart of an exemplary process for managing a home automation system from a perspective of the user device. For purposes of discussion, assume that exemplary home automation module 500 resides in memory 430 of user device 210. In one implementation, user device 210 may download home automation module 500 from service provider server 225.

In Block 602, user device 210 may establish a communication link via a network, such as network 220, with a central control unit of a home automation system, such as central control unit 250 of home automation system 240. In one implementation, home automation module 500 may include a GUI component that allows a user to connect to central control unit 250. In another implementation, user device 210 may include, for example, a web browser or some other type of GUI component to connect to central control unit 250.

In Block 604, user device 210 may access and receive home automation configuration data from central control unit 250. For example, the home automation configuration data may include any data relating to the operation of home automation system 240 and the managing and controlling of the home devices connected thereto. For example, home automation configuration data may include data, such as setup data, control data, and status data related to central control unit 250, slave units 260, and/or the home devices connected thereto.

In Block 606, user device 210 may convert the home automation configuration data to graphical home automation configuration data that may be displayed on display 350 of user device 210. Depending on the format of the home automation configuration data stored in home automation system 240 (e.g., configuration data stored in central control unit 250), the home automation configuration data may be converted into a format that is displayable in a graphical format on display 350. The format of the graphical home automation configuration data may be based on the implementation of home automation module 500, the operating system of user device 210, etc.

In Block 608, user device 210 may manage and control home automation system 240. For example, a user may be able to setup, control, and/or determine status information for any home device connected to home automation system 240 using a GUI component, such as home automation module 500, as described herein. For example, as described and illustrated in reference to FIG. 7-FIG. 13, user device 210 may assign icons to represent a home device, control the turning on and the turning off of a home device, and view state information, such as whether a home device is on or off.

In Block 610, user device 210 may re-convert the graphical home automation configuration data to home automation configuration data. That is, the graphical home automation configuration data may be converted back to the format of home automation system 240 (e.g., of central control unit 250).

In Block 612, user device 210 may store via the network, such as network 220, the home automation configuration data in central control unit 250 of home automation system 240. For example, when user device 210 modifies the home automation configuration data (e.g., changes a setting for a home device), these changes may be stored in central control unit 250.

Although FIG. 6(a) illustrates exemplary operations for accessing and controlling home automation system 240 via network 220, in other implementations, fewer, additional, or different operations may be performed. For example, in one implementation, user device 210 may be able to download a portion of home automation module 500 from service provider server 225. That is, when a user wants to view status information, user device 210 may only download status module 530. In another implementation, a user may not download home automation module 500. That is, user device 210 may include home automation module 500.

Additionally or alternatively, in reference to Block 602 and/or Block 604, in other implementations, user device 210 may not establish a communication link with home automation system 240. For example, service provider server 225 may service requests from user device 210 for accessing and managing home automation system 240. For example, service provider server 225 may include home automation module 500. In one implementation, service provider server 225 may retrieve the home automation configuration data associated with home automation system 240 upon receiving the request. Additionally, or alternatively, service provider server 225 may store the home automation configuration data associated with home automation system 240. In one implementation, service provider server 225 may periodically update the home automation configuration data by periodically communicating with home automation system 240. When necessary, depending on the format of the home automation configuration data, service provider server 225 may convert the home automation configuration data associated with home automation system 240 to graphical home automation configuration data. Additionally, service provider server 225 may update, if needed, the home automation configuration data on home automation system 240. For example, service provider server 225 may update the home automation configuration data when a user modifies the home automation configuration data.

Additionally, or alternatively, in reference to Block 606, in other implementations, the home automation configuration data may not be converted. For example, depending on the implementation of home automation system 240 and/or central control unit 250, home automation module 500 may be configured to display the home automation configuration data on display 350 without format conversion. In still other implementations, the home automation configuration data may be converted by other devices of system 200, such as service provider server 225.

Additionally, or alternatively, in reference to Block 608, in other implementations, the graphical user interface, such as home automation module 500, may reside on service provider server 225.

Additionally, or alternatively, in reference to Block 612, in other implementations, user device 210 may not cause the home automation configuration data to be stored by home automation system 240. For example, when a user does not modify the home automation configuration data, user device 210 may not store the home automation configuration data. For example, when a user only views the status information of a home device, user device may not store the home automation configuration data.

Figure 6B:
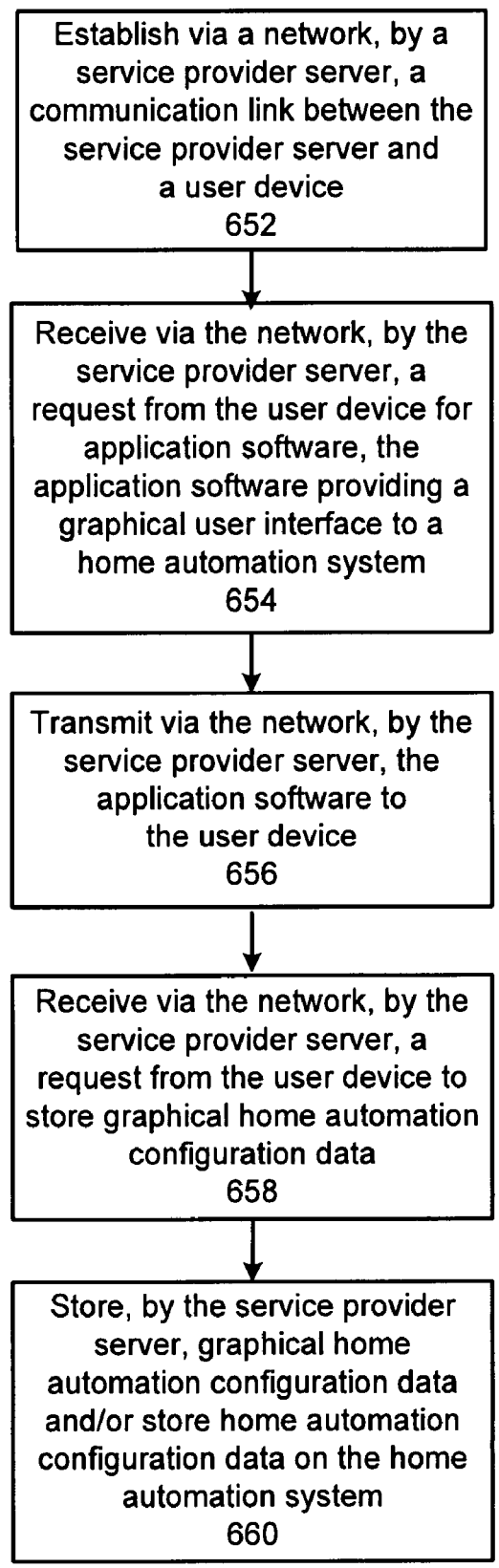
FIG. 6(b) is a flow chart of an exemplary process for managing a home automation system from a perspective of the service provider server.

FIG. 6(b) is a flow chart of an exemplary process for managing a home automation system from a perspective of the service provider server. For purposes of discussion, assume that exemplary home automation module 500 resides on service provider server 225.

In Block 652, service provider server 225 may establish a communication link via a network, such as network 220, with user device 210. For example, a user of user device 210 may establish a connection with service provider 225 via the Web or some other network. A user may log into service provider server 225, and service provider server 225 may verify user log-in information. When service provider server 225 authenticates a user of user device 210, service provider server 225 may establish a communication link with user device 210.

In Block 654, service provider server 225 may receive via network 220 a request from user device 210 for application software, such as home automation module 500. For example, user device 210 may navigate through links of service provider server 225 to request home automation module 500. In one implementation, user device 210 may request a component of home automation module 500, such as status module 530. In other implementations, user device 210 may request all of the components of home automation module 500.

In Block 656, service provider server 225 may transmit, via network 220, one or more portions of home automation module 500 to user device 210.

In Block 658, service provider server 225 may receive a request via network 220 from user device 210 to store graphical home automation configuration data. For example, user device 210 may want to store graphical home automation configuration data associated with setup module 510 and/or control module 520 of home automation module 500. For example, as described in reference to FIG. 7-FIG. 13, user device 210 may generate graphical home automation configuration data when accessing and managing home automation system 240 with home automation module 500.

In Block 660, service provider server 225 may store the graphical home automation configuration data. For example, service provider server 225 may store the graphical home automation configuration data on storage device 450. In other examples, service provider server 225 may store home automation configuration on home automation system 240 that may cause home automation system 240 to control the operation of a home device. For example, when a user controls the operation of a home device with control module 520, the graphical home automation configuration data of control module 520 may be converted by service provider server 225 and stored on home automation system 240.

Although FIG. 6(b) illustrates exemplary operations for accessing and controlling home automation system 240 via network 220, in other implementations, fewer, additional, or different operations may be performed. For example, in other implementations, service provider server 225 may retrieve home automation configuration data and/or have stored home automation configuration data. Service provider server 225 may present this data to a user upon request. A user may access and manage his/her home automation system 240 via service provider server 225, and when any modifications are made, service provider server 225 may store this data on home automation system 240 which may cause a home device to operate, for example, differently, based on new control settings.

FIG. 7-FIG. 13 are diagrams illustrating exemplary graphical user interfaces displayed on the user device for managing the home automation system depicted in FIG. 2. In one implementation, setup module 510, control module 520, and status module 530, may include window-based GUI components. Each of FIG. 7-FIG. 13 is depicted as a screenshot displayed on display 350 of user device 210. Although not illustrated, home automation module 500 may include a main menu in which a user may access setup module 510, control module 520, and status module 530.

Figure 7:
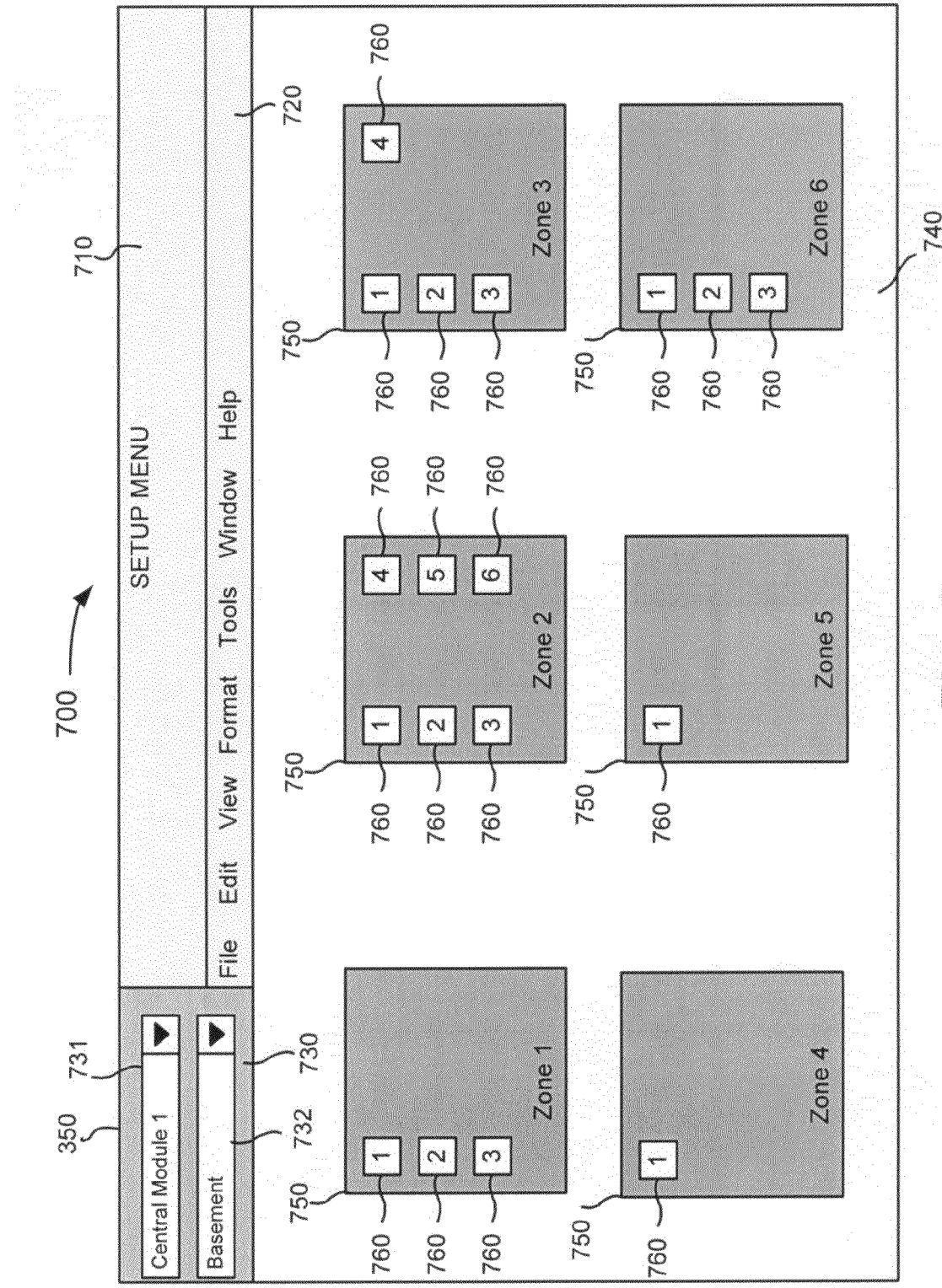
FIG. 7-FIG. 13 are diagrams illustrating exemplary graphical user interfaces that may be displayed on the user device for managing the home automation system.

FIG. 7 is a diagram illustrating an exemplary GUI component of setup module 510 of home automation module 500. As illustrated, GUI component 700 may include a title bar 710, a pull-down menu 720, a selector menu 730, a working space 740, zones 750, and home devices 760.

Title bar 710 may indicate to a user which portion of home automation system 500 is accessed. For example, title bar 710 may indicate that a user is accessing a "Setup Menu" of setup module 510. Pull-down menu 720 may provide a user with access to various functions associated with initializing the graphical representation of home automation system 240 and the home devices 760 connected thereto. Selector menu 730 may include component selector 731 and home selector 732. For example, a user may select a component of home automation system 240, such as "Central Module 1". For example, "Central Module 1" may represent central control unit 250. Home selector 732, for example, may allow a user to select various regions of the home, such as the entire home, a floor of their home, or a room of their home. For example, a user may select a floor of their home, such as "Basement." In other instances, a user may navigate by double clicking on various graphics in working space 740.

Zone 750 may represent a room in a user's home. Home devices 760 may represent a home device connected to home automation system 240. In this example, working space 740 may include default graphical configuration data, such as zones 750 and home devices 760, which a user may view and edit as described below.

In this example, GUI component 700 depicts that a central control unit, such as central control unit 250, controls home devices 760 in the basement. The basement of a user's home may include six zones 750 (i.e., six rooms), where each zone 750 may include zero or more home devices 760. The type of home devices 760 may be viewed and/or accessed by a user for initialization purposes.

Figure 8:
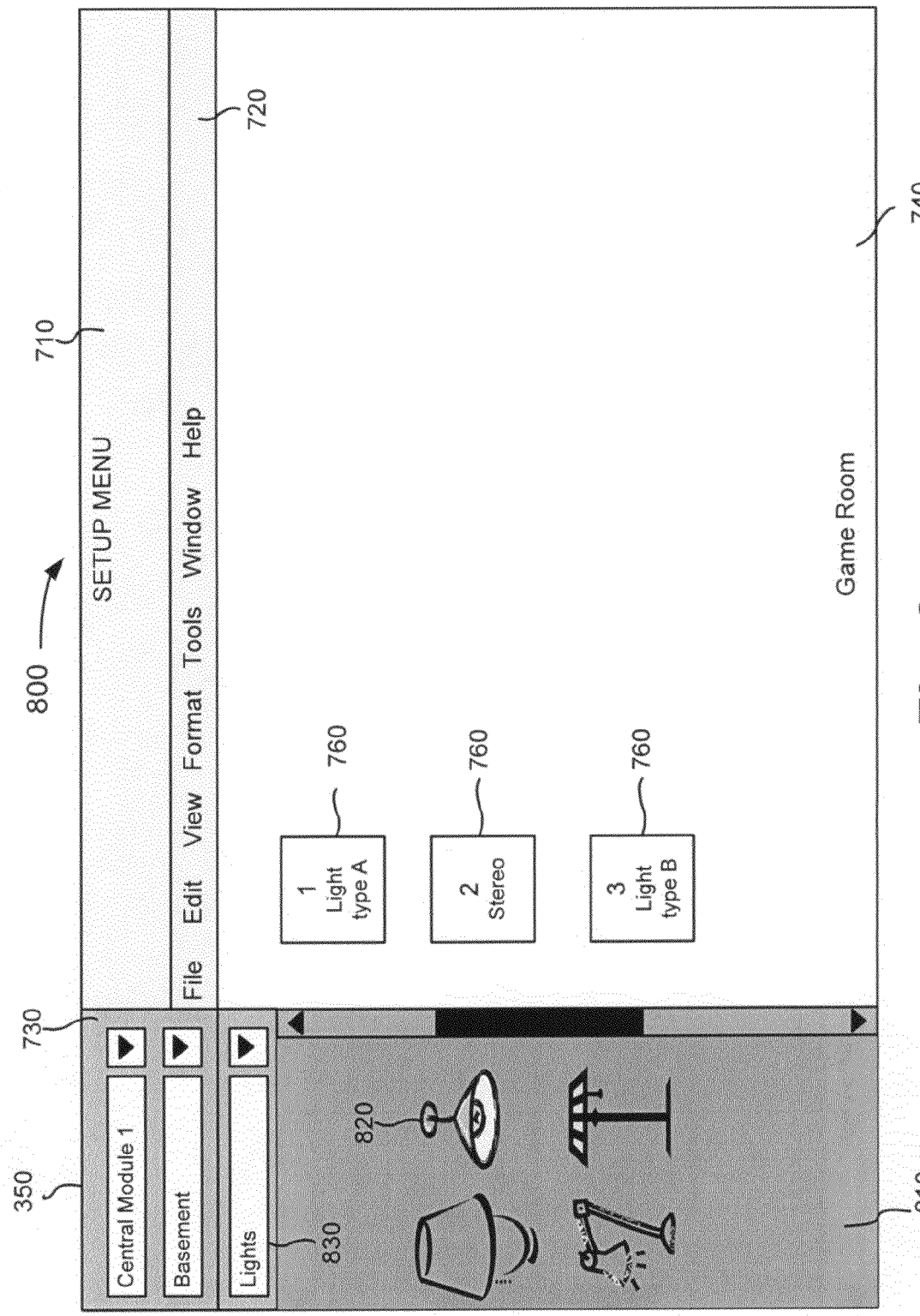

FIG. 8 through FIG. 13 are diagrams illustrating exemplary GUIs associated with the initialization of "Zone 1" depicted in FIG. 7. For purposes of discussion, assume that a user, among other things, double-clicked on "Zone 1" graphic depicted in FIG. 7 to reach the screen shot of FIG. 8. As illustrated in FIG. 8, in addition to components previously described, GUI component 800 of setup module 510 may include a toolbox 810. Toolbox 810 may allow a user to graphically represent home devices 760 with corresponding icons, such as icons 820. Toolbox 810 may include an icon selector 830 for selecting categories of icons 820 to represent home devices 760.

In one implementation, GUI component 800 may provide home device 760 type information based on the configuration data of central control unit 250 to allow a user to know the type of home device that corresponds to home device 760. For example, the configuration data of central control unit 250 may include information, such as "Basement: Zone 1:1—light type A; 2—stereo; 3—light type B." In this example, "1—light type A" may indicate that home device 760 may include a light with dimming features, and "3—light type B" may indicate that home device 760 may include a light without dimming features (e.g., on/off only). Based on this information, a user may be able to select icons 820 for each home device 760. That is, a user may be able to identify that "1—light type A" corresponds to ceiling light 270 and "3—light type B" corresponds to floor lamp 260 (as illustrated in FIG. 2). GUI component 800 may also permit a user to rename certain items, such as renaming "Zone 1" to "Game Room."

Figure 9:
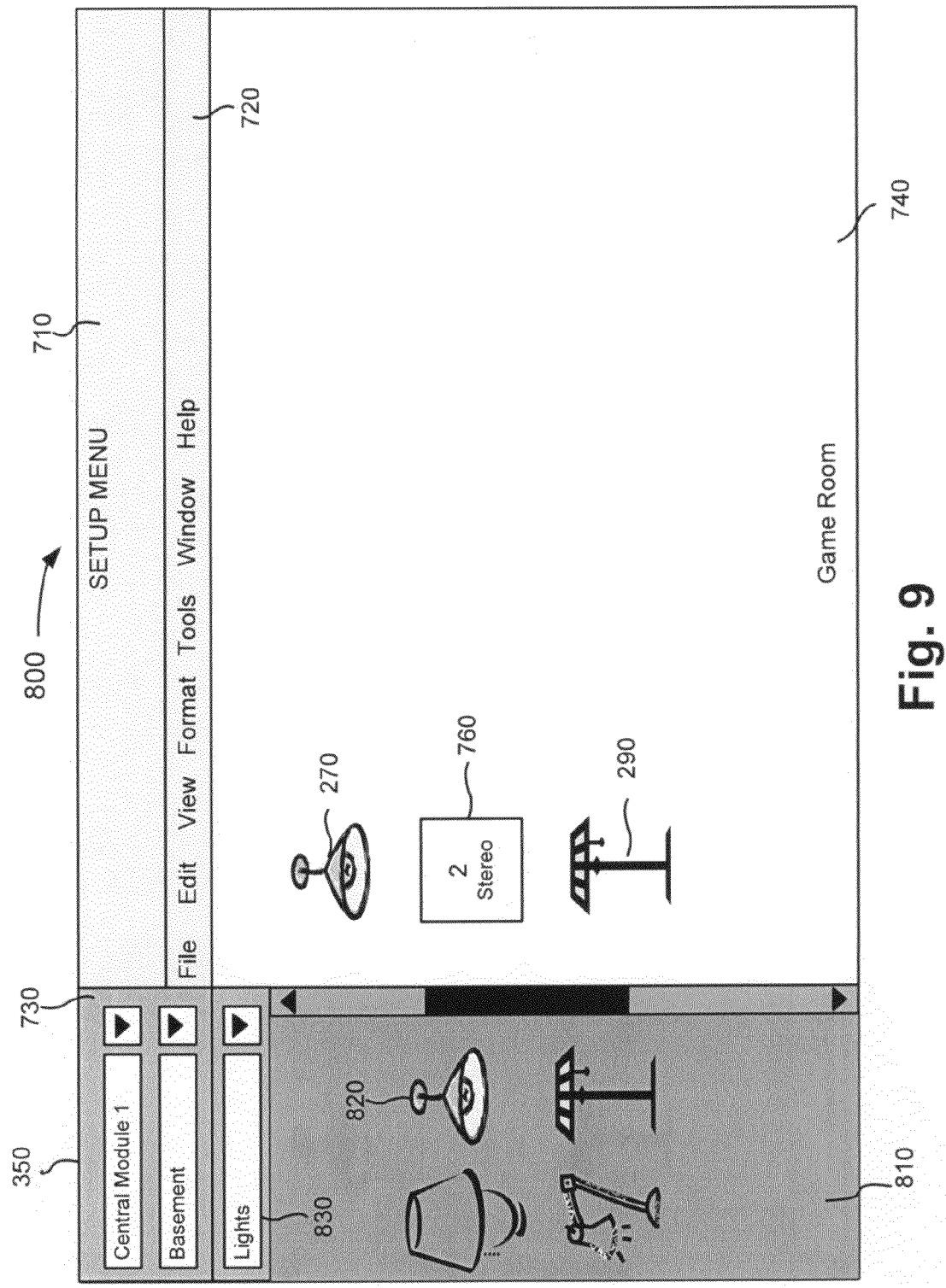
Figure 10:
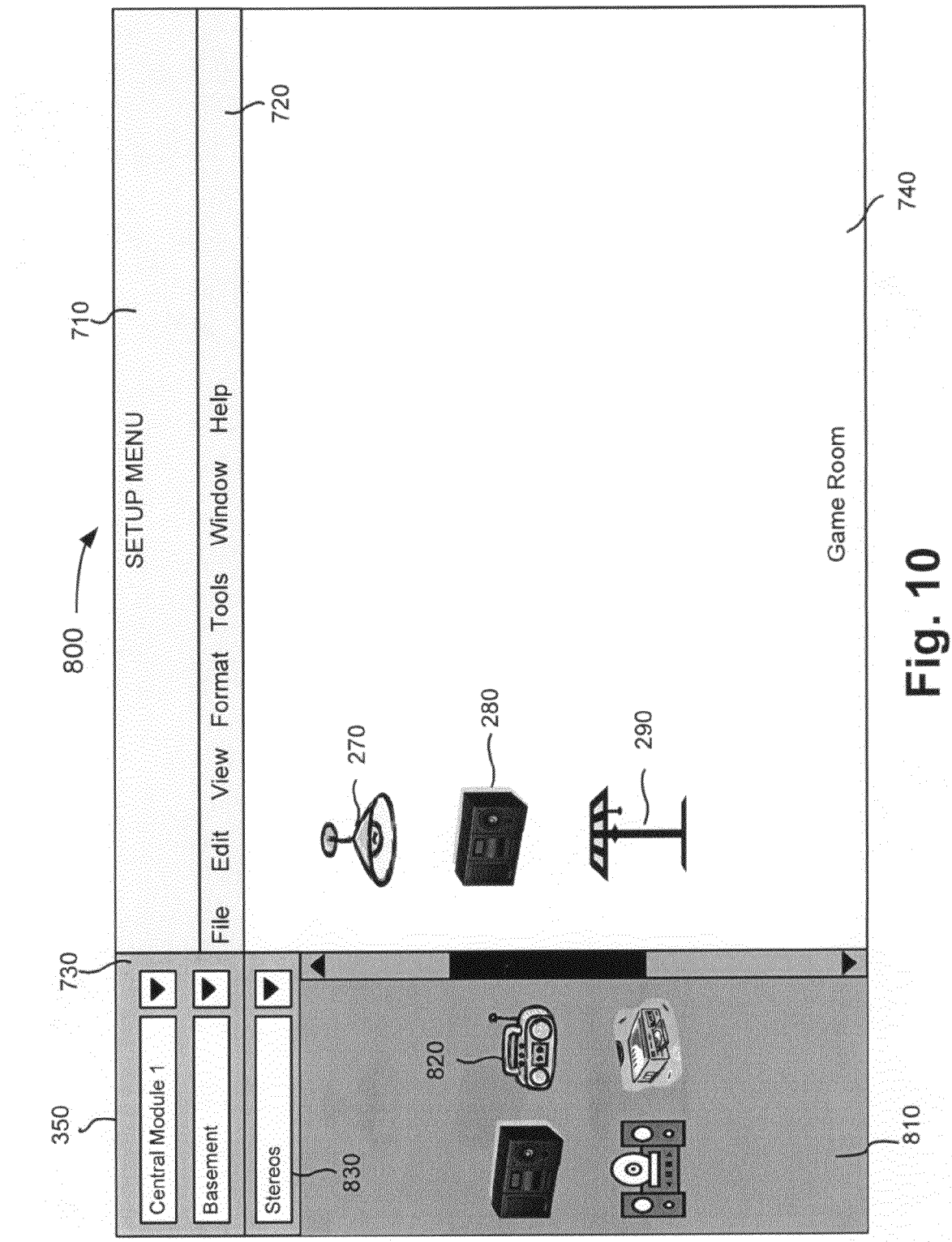

FIG. 9 and FIG. 10 are diagrams illustrating the initialization of home devices 760 with corresponding icons 820. For discussion purposes only, the reference numbers of icons 820 in working space 740 correspond to the home devices depicted in FIG. 2, namely ceiling light 270, stereo 280, and floor lamp 290. Further, assume that a user may, for example, drag-and-drop icons 820 to working space 740 in order to replace the default boxes in working space 740. As illustrated in FIG. 9, a user may replace home devices 760 with icons 820 (i.e., ceiling light 270 and floor lamp 290). In FIG. 10, a user may replace home device 760 with icon 820 (i.e., stereo 280).

Figure 11:
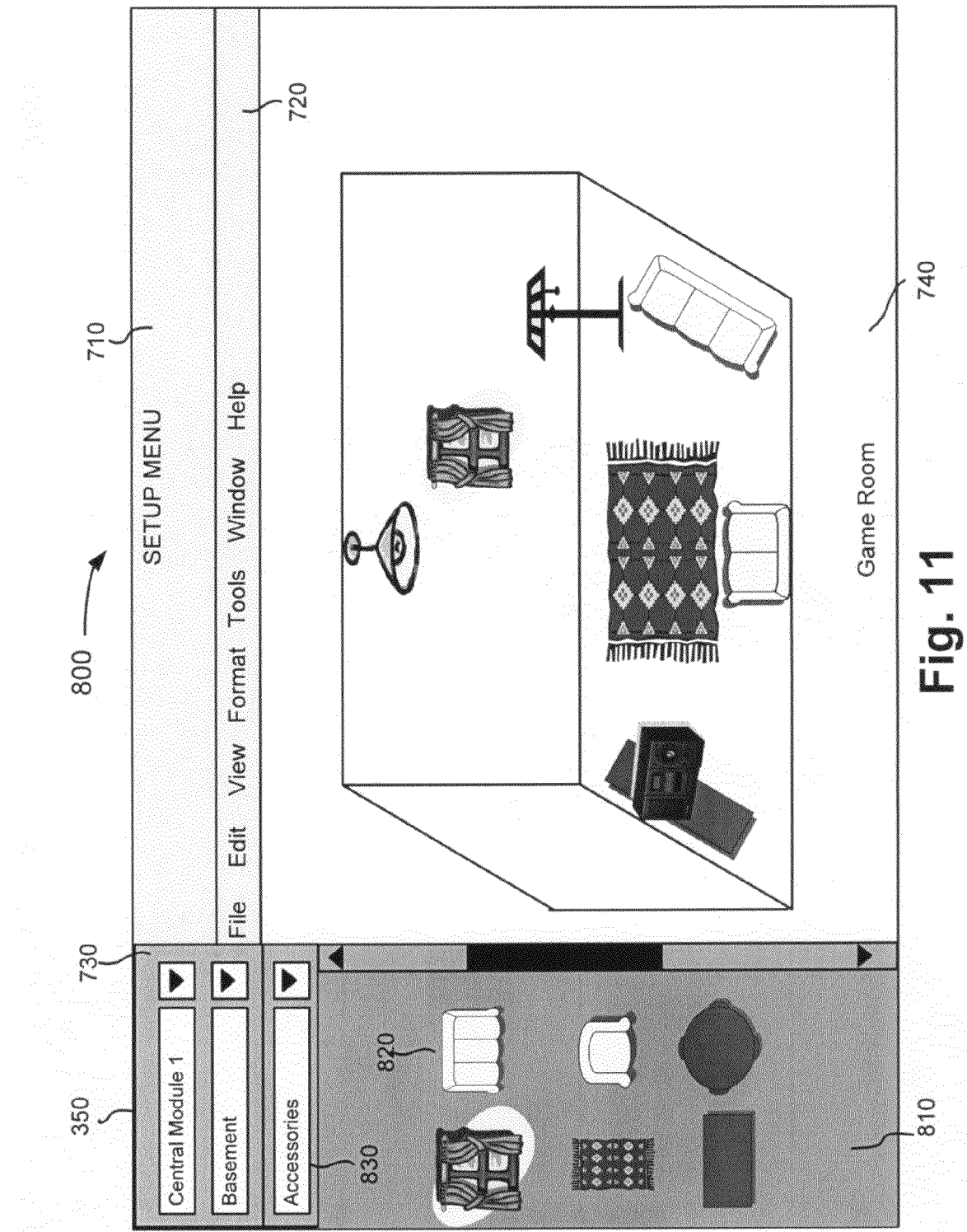

FIG. 11 is a diagram that illustrates additional features that may be employed to mimic any room of a user's home. For example, a standard room template having floor and walls could be added to working space 740. Additionally, icons 820 representing accessories could be added by a user to more accurately depict a room. For example, as illustrated in FIG.

11, icons 820 may include windows, furniture, or rugs. In this way, a user may be able to more accurately represent a room and provide an even more user-friendly environment to manage home automation system 240 and the home devices 760 connected thereto.

Although FIG. 7-FIG. 11 illustrate exemplary GUIs for setup module 510 of home automation module 500, in other implementations, GUI components 700 and/or 800 may include fewer, different, or additional graphical representations associated with home automation system 240 and/or home devices 760. Additionally, or alternatively, GUI components 700 and/or 800 may include fewer, different, or additional functions than those described herein. Further, it is to be understood that the graphical configuration data associated with setup module 510 may be stored in, for example, user device 210, or other components of system 200, such as service provider server 225. In this way, a user may not have to re-initialize (e.g., assign icons 820, rename zones 750, etc.) the configuration data of home automation system 240 each time home automation system 240 is accessed and managed.

Figure 12:
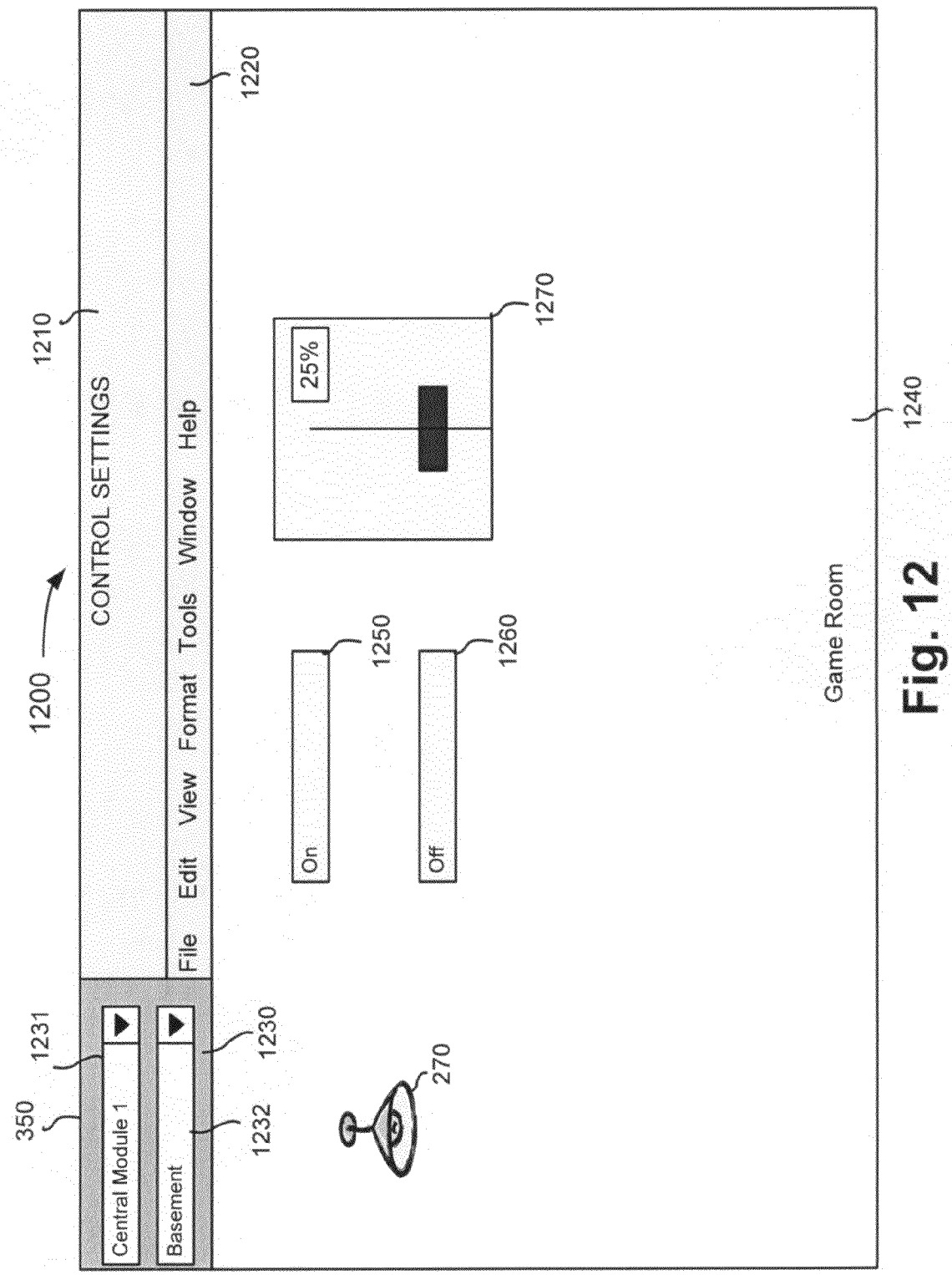

FIG. 12 is a diagram of an exemplary GUI component of control module 520 of home automation module 500. For purposes of discussion, assume a user navigated through control module 520 to access a control setting window for ceiling light 270. As illustrated, GUI component 1200 may include a title bar 1210, a pull-down menu 1220, a selector menu 1230, a working space 1240, and controllers 1250, 1260, and 1270. In this example, working space 1240 depicts a control window for an individual home device 760, such as ceiling light 270.

Title bar 1210 may indicate to a user which portion of home automation module 500 is accessed. Pull-down menu 1220 may provide a user with access to various functions associated with controlling home devices 760, such as setting on and off times, etc. Pull-down menu 1220 may also allow a user to set control parameters in a global-based, floor-based, room-based, or individual home device-based manner.

Selector menu 1230 may include component selector 1231 and home selector 1232. For example, a user may select a component of home automation system 240, such as "Central Module 1". For example, "Central Module 1" may represent central control unit 250. Home selector 1232, for example, may allow a user to select various regions of the home, such as the entire home, a floor of their home, or a room of their home. For example, a user may select a floor of their home, such as "Basement." In other instances, a user may navigate by double clicking on various graphics in working space 1240.

Working space 1240 may include the graphical representation of home devices 760 and their corresponding control setting information. As described below, controllers 1250, 1260, and 1270 may provide a user with a graphical interface to adjust and/or control various parameters associated with the operation of home device 760, such as ceiling light 270.

For example, ceiling light 270 may include controllers 1250, 1260, and 1270. Controller 1250 may allow a user to set when ceiling light 270 may turn on. Controller 1260 may allow a user to set when ceiling light 270 may turn off. For example, a user may set the time by, for example, double-clicking on controller 1250 or 1260 to access a time window. Controller 1270 may allow a user to set a level of light ceiling light 270 may have when turned on by sliding a slider of controller 1270.

Although FIG. 12 illustrates an exemplary GUI for control module 520 of home automation module 500, in other implementations, GUI component 1200 may include fewer, different, or additional graphical representations of control settings, components associated with home automation system 240 and/or home devices 760. Additionally, or alternatively, GUI component 1200 may include fewer, different, or additional functions than those described herein.

Figure 13:
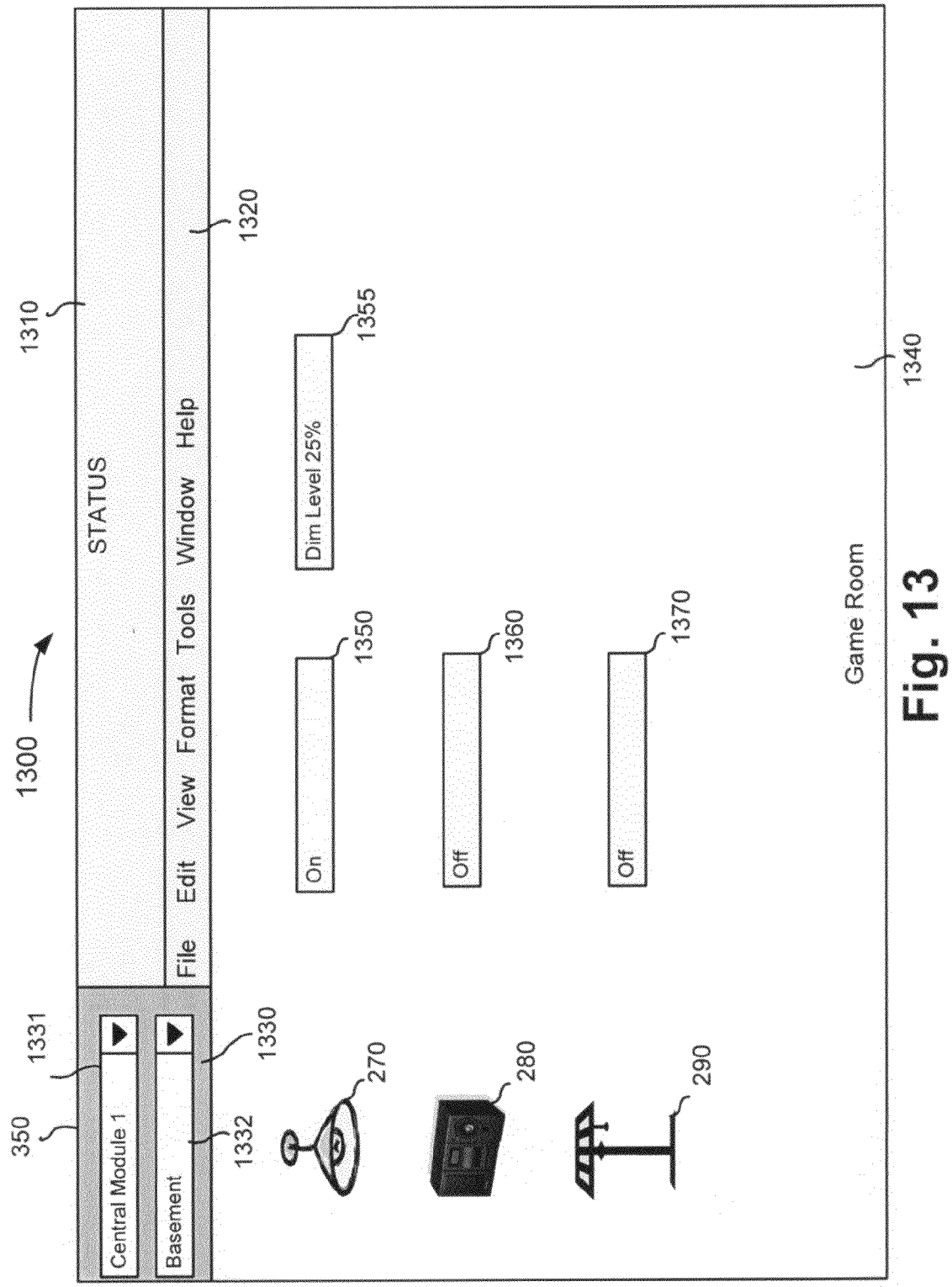

FIG. 13 illustrates a diagram of an exemplary GUI component of status module 530 of home automation module 500. For purposes of discussion, assume a user navigated through status module 530 to access a status window for "Game Room." As illustrated, GUI component 1300 may include a title bar 1310, a pull-down menu 1320, a selector menu 1330, a working space 1340, and status indicators 1350, 1355, 1360, and 1370. In this example, working space 1340 depicts a status window for zone 750 (i.e., Zone 1), such as a game room.

Title bar 1310 may indicate to a user which portion of home automation module 500 is accessed. Pull-down menu 1320 may provide a user with access to various functions associated with viewing status information, such as global status views, home floor views, room views, or an individual home device view. Selector menu 1330 may include component selector 1331 and home selector 1332. For example, a user may select a component of home automation system 240, such as "Central Module 1". For example, "Central Module 1" may represent central control unit 250. Home selector 1332, for example, may allow a user to select various regions of the home, such as the entire home, a floor of their home, or a room of their home. For example, a user may select a floor of their home, such as "Basement." In other instances, a user may navigate by double clicking on various graphics in working space 1340.

Working space 1430 may include the graphical representation of home devices 760 and their corresponding status information. As described below, status indicators 1350, 1355, 1360, and 1370 may indicate to a user the status of each home device 760, such as whether home device 760 is on, off, or other status information.

For example, ceiling light 270 may include status indicators 1350 and 1355. Status indicator 1350 may indicate that ceiling light 270 is currently on. Status indicator 1355 may indicate that ceiling light 270 is at a twenty-five percent (25%) dim level. Further, as illustrated in FIG. 13, status indicator 1360 may indicate that stereo 280 is off, and status indicator 1370 may indicate that floor lamp 290 is off.

Although FIG. 13 illustrates an exemplary GUI for status module 530 of home automation module 500, in other implementations, GUI component 1300 may include fewer, different, or additional graphical representations of status information, components associated with home automation system 240 and/or home devices 760. Additionally, or alternatively, GUI component 1300 may include fewer, different, or additional functions than those described herein.

The foregoing description of implementations provides illustration, but is not intended to be exhaustive or to limit the implementations to the precise form disclosed. Modifications and variations are possible in light of the above teachings or may be acquired from practice of the teachings. The foregoing description, however, provides a user-friendly environment for accessing and managing a home automation system via a network.

In addition, while series of blocks have been described with regard to processes illustrated in FIG. 6(*a*) and FIG. 6(*b*), the order of the blocks may be modified in other implementations. Further, non-dependent blocks may be performed in parallel.

It will be apparent that aspects described herein may be implemented in many different forms of software, firmware, and hardware in the implementations illustrated in the figures.

The actual software code or specialized control hardware used to implement aspects does not limit the invention. Thus, the operation and behavior of the aspects were described without reference to the specific software code—it being understood that software and control hardware can be designed to implement the aspects based on the description herein.

No element, act, or instruction used in the present application should be construed as critical or essential to the implementations described herein unless explicitly described as such. Also, as used herein, the article "a", "an", and "the" are intended to include one or more items. Where only one item is intended, the term "one" or similar language is used. Further, the phrase "based on" is intended to mean "based, at least in part, on" unless explicitly stated otherwise.

As used herein, the term "and/or" includes any and all combinations of one or more of the associated list items.

What is claimed is:

1. A device, comprising:
    a memory to store a graphical application associated with an automation system;
    a processor to execute the graphical application to:
        establish, via a network, a communication link with a node having configuration data associated with the automation system, where the configuration data controls at least one device, associated with a user, in communication with the automation system, the at least one device being located at a location that is associated with the user,
        receive, via the network, and from the node, the configuration data associated with the automation system,
        provide, based on the received configuration data, a graphical user interface,
        detect, via the graphical user interface, selection, from the user, of information identifying a particular region associated with the location,
        receive, from the user via the graphical user interface, one or more modifications to the configuration data to obtain modified configuration data that controls the at least one device, where, when receiving the one or more modifications, the processor is to:
            detect, from the user via the graphical user interface, selection of at least one user-defined icon, that is identified based on a type of the at least one device, to represent the at least one device,
            provide, via the graphical user interface, a template of a room that corresponds to a room associated with the particular region, and
            receive, from the user via the graphical user interface:
                input associated with moving the at least one user-defined icon to a position in the template that corresponds to a position of the at least one device in the particular region, and
                parameters associated with an operation of the at least one device, and
        store, on the node, via the network, the modified configuration data.

2. The device of claim 1, where the node is a home automation system.

3. The device of claim 1, where the node is a server associated with a service provider.

4. The device of claim 1, where the processor is further to:
    detect, from the user via the graphical user interface, selection of information identifying at least one of:
        the at least one device, the room associated with the particular region, a floor associated the at least one device, a home associated the at least one device, a day, a time, or a category associated with the at least one device, and
    where the one or more modifications are received based on the selection of the information identifying the at least one of the at least one device, the room associated with the particular region, the floor, the home, the day, the time, or the category associated with the at least one device.

5. The device of claim 1, where the processor is further to present, to the user via the graphical user interface, state information associated with the at least one device.

6. The device of claim 1, where the processor further is to:
    convert the configuration data to graphical configuration data,
    where the graphical user interface is provided based on the graphical configuration data, and
    where, when receiving the one or more modifications to the configuration data, the processor is receive one or more modifications to the graphical configuration data, and
    convert the graphical configuration data to the modified configuration data, after receiving the one or more modifications to the graphical configuration data,
    where, when storing the configuration data on the node, the processor is to store the modified configuration data converted from the graphical configuration data.

7. The device of claim 1, where the processor is further to receive, from the user via the graphical user interface, input to control a turning on and a turning off of the at least one device.

8. The device of claim 1, where the processor is further to receive, from the user via the graphical user interface, input to modify a central control unit of the automation system.

9. A method, comprising:
    receiving, by a user device, configuration data associated with an automation system;
    displaying, by the user device, and via a graphical user interface, the configuration data in a graphical format, the configuration data representing at least one device associated with a user, the at least device being located at a location associated with the user;
    presenting, by the user device and via the graphical user interface, information associated with a type of the at least one device and one or more icons associated with one or more types of devices;
    receiving, by the user device and via the graphical user interface, one or more modifications to the configuration data to obtain modified configuration data that controls the at least one device, where receiving the one or more modifications include:
        detecting, by the user device and via the graphical user interface, selection of a particular icon, from the one or more icons, that is associated with the type of the at least one device, where
        presenting, by the user device and via the graphical user interface, a template of a location that corresponds to the location associated with the user after detecting selection of the particular icon, and
        receiving, by the user device and via the graphical user interface, an input associated with moving the particular icon to a position in the template that corresponds to a position of the at least one device in the location associated with the user; and
    causing, by the user device, the modified configuration data to be stored within the automation system.

10. The method of claim 9, further comprising:
    presenting, to the user, state information associated with the at least one device, where the state information indicates that the at least one device is turned on or turned off.

11. The method of claim 9, where receiving the one or more modifications to the configuration data further comprises:
   detecting, by the user device and via the graphical user interface, selection of information identifying at least one of:
      the at least one device, a room of a home associated with the location associated with the user, a floor of a home associated with the location associated with the user, a home associated with the location associated with the user, a time, a day, or a category of the least one device,
   where the one or more modifications are received after detecting the selection of the information.

12. The method of claim 9, where displaying the configuration data comprises:
   displaying a graphical representation of each of a plurality of floors, of the location associated with the user, the graphical representation of each of the plurality of floors including information identifying each device, in communication with the automation system, located on the floor,
   where the graphical representation of a first floor, of the plurality of floors, is displayed with the graphical representation of at least a second floor of the plurality of floors.

13. The method of claim 9, where displaying the configuration data comprises:
   converting the configuration data to the graphical format.

14. The method of claim 9, receiving the one or more modifications further includes:
   detecting, by the user device and via the graphical user interface, selection of at least one control setting associated with the at least one device.

15. The method of claim 14, where detecting the selection of the at least one control setting includes detecting selection of a control setting of at least one of:
   a room of the location associated with the user, a floor of the location associated with the user, or the location associated with the user.

16. A non-transitory memory comprising:
   one or more instructions which, when executed by at least one processor, cause the at least one processor to:
      receive configuration data, associated with at least one device, from an automation system that is in communication with the at least one device, the at least one device being located remotely from a user of the at least one device;
      provide, based on the configuration data, a graphical user interface,
      display, via the graphical user interface, a first icon that includes information associated with a type of the at least one device,
      receive, via the graphical interface, from the user of the at least one device, one or more modifications, to the configuration data, to obtain modified configuration data, where the one or more instructions that cause the at least one processor to receive the one or more modifications include one or more instructions to:
         detect, from the user via the graphical user interface, selection of a second icon corresponding to the type of the at least one device, the second icon being different than the first icon,
         replace the first icon with the second in response to detecting the selection of the second icon,
         detect, from the user via the graphical user interface, an input to move the second icon to a position, in a template, that corresponds to a position of the at least one device in a particular location that is remote from the user, the template graphically representing a particular location, and
         receive, from the user via the graphical user interface, parameters associated with an operation of the at least one device; and
      transfer the modified configuration data to the automation system for storage.

17. The non-transitory memory of claim 16, where the one or more instructions that cause the at least processor to detect the input to move the second icon include one or more instructions to detect an input associated with a drag and drop of the second icon.

18. The non-transitory memory of claim 16, further comprising one or more instructions to:
   display status information, associated with the at least one device, via the graphical user interface,
   where the status information includes information identifying a usage level of the at least one device.

* * * * *